(12) United States Patent
Ji et al.

(10) Patent No.: US 11,513,785 B2
(45) Date of Patent: Nov. 29, 2022

(54) KNOWLEDGE BASE FOR PREDICTING SUCCESS RATE OF LIFE CYCLE MANAGEMENT

(71) Applicant: Dell Products L.P., Round Rock, TX (US)

(72) Inventors: Jim Lewei Ji, Shanghai (CN); Muzhar S. Khokhar, Shrewsbury, MA (US)

(73) Assignee: Dell Products L.P., Round Rock, TX (US)

( * ) Notice: Subject to any disclaimer, the term of this patent is extended or adjusted under 35 U.S.C. 154(b) by 279 days.

(21) Appl. No.: 16/892,115

(22) Filed: Jun. 3, 2020

(65) Prior Publication Data
US 2021/0382759 A1    Dec. 9, 2021

(51) Int. Cl.
*G06F 8/65* (2018.01)
*G06F 9/455* (2018.01)
*G06F 9/50* (2006.01)
*G06N 5/04* (2006.01)

(52) U.S. Cl.
CPC ............ *G06F 8/65* (2013.01); *G06F 9/45558* (2013.01); *G06F 9/505* (2013.01); *G06F 9/5077* (2013.01); *G06F 2009/4557* (2013.01); *G06F 2009/45595* (2013.01); *G06N 5/04* (2013.01)

(58) Field of Classification Search
None
See application file for complete search history.

(56) References Cited

U.S. PATENT DOCUMENTS

| | | | |
|---|---|---|---|
| 10,084,645 B2 | 9/2018 | Bouz et al. | |
| 2011/0276956 A1* | 11/2011 | Yuki | G06F 8/65 717/170 |
| 2013/0006701 A1* | 1/2013 | Guven | G06Q 10/0635 705/7.28 |
| 2017/0034023 A1* | 2/2017 | Nickolov | H04L 43/0817 |
| 2019/0319839 A1 | 10/2019 | Nozhchev et al. | |

* cited by examiner

*Primary Examiner* — Qing Yuan Wu
(74) *Attorney, Agent, or Firm* — Jackson Walker L.L.P.

(57) ABSTRACT

An information handling system may be configured for: receiving first information from a plurality of other remote information handling systems indicative of a success or a failure of a corresponding upgrade event that was performed at such other remote information handling systems; receiving second information from the plurality of other remote information handling systems indicative of scores for such other remote information handling systems in a plurality of metrics; determining, based on the first and second information, a ranking of the metrics based on their criticality to the upgrade event; receiving third information from the particular remote information handling system indicative of scores for the particular remote information handling system in the plurality of metrics; and determining a likelihood of success for the upgrade event based on the determined ranking of the metrics and the scores for the particular remote information handling system in the plurality of metrics.

20 Claims, 2 Drawing Sheets

KNOWLEDGE BASE FOR PREDICTING SUCCESS RATE OF LIFE CYCLE MANAGEMENT

TECHNICAL FIELD

The present disclosure relates in general to information handling systems, and more particularly to life cycle management events in a cluster environment such as a hyper-converged infrastructure (HCI) cluster.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As used herein, the term life cycle management (LCM) refers to an approach for upgrading components within a cluster of information handling systems (e.g., containing some number 2 to N of individual node systems). Such clusters may comprise hyper-converged infrastructure (HCI) clusters in some embodiments. HCI generally refers to a software-defined IT infrastructure, which typically includes elements such as virtualized computing (e.g., a hypervisor), software-defined storage, and virtualized networking (e.g., software-defined networking).

In these and other embodiments, nodes of a cluster may be located within a single datacenter, or they may be geographically distributed elements of a networked architecture. For example, HCI clusters may be used in the context of a remote office branch office (ROBO) deployment. In some embodiments, each location may include its own set of one or more nodes of an HCI cluster appliance.

During an LCM event, typically each node of a cluster may be upgraded, with upgrade components such as firmware upgrades, drivers, application software, etc. until the entire cluster reaches the same system version. A single upgrade bundle package may be used to upgrade an HCI cluster appliance as a whole in some embodiments.

In a ROBO deployment scenario, each office/site may contain a minimum footprint of the cluster to support local IT operation needs, and the IT administrator may usually manage these distributed HCI facilities from a centralized place (typically the headquarters of the business). When a new update is required for the HCI facilities at a ROBO site, an upgrade bundle is pushed to each end point, and then the administrator may schedule a maintenance window to apply the update. When all of the HCI endpoints upgrade to a target version/level, the operator will mark it as a successful LCM attempt and complete. This scenario illustrates several issues:

1) The upgrade bundle is pushed from a centralized management office, and so the bandwidth and network conditions can affect the progress and results significantly. Each ROBO site might receive a complete upgrade bundle at different times even if they were triggered at the same time.

2) The maintenance window of ROBO sites may be different due to geographical reasons or time zones, and so the upgrades may not be triggered at the same time.

3) Each LCM attempt at a ROBO site is an isolated and standalone LCM event. That is, there is no correlated side-effect other ROBO sites based on its success or failure.

4) Based on #3, there is no existing solution for predicting how likely it is that an LCM attempt will succeed or fail at a given ROBO site, even if the hardware configuration baseline is identical among these sites.

5) The LCM success rate is unpredictable, which is particularly problematic for companies with thousands of ROBO sites requiring LCM update.

Accordingly, embodiments of this disclosure may provide benefits in terms of the predictability of the success or failure of LCM events in ROBO deployments.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with lifecycle management may be reduced or eliminated.

In accordance with embodiments of the present disclosure, an information handling system may include at least one processor; and a non-transitory memory coupled to the at least one processor. The information handling system may be configured to manage an upgrade event of a particular remote information handling system by: receiving first information from a plurality of other remote information handling systems indicative of a success or a failure of a corresponding upgrade event that was performed at such other remote information handling systems; receiving second information from the plurality of other remote information handling systems indicative of scores for such other remote information handling systems in a plurality of metrics; determining, based on the first and second information, a ranking of the metrics based on their criticality to the upgrade event; receiving third information from the particular remote information handling system indicative of scores for the particular remote information handling system in the plurality of metrics; and determining a likelihood of success for the upgrade event based on the determined ranking of the metrics and the scores for the particular remote information handling system in the plurality of metrics.

In accordance with these and other embodiments of the present disclosure, a method may include receiving a request from a particular remote information handling system regarding an upgrade event; receiving first information from a plurality of other remote information handling systems indicative of a success or a failure of a corresponding upgrade event that was performed at such other remote information handling systems; receiving second information from the plurality of other remote information handling systems indicative of scores for such other remote information handling systems in a plurality of metrics; determining, based on the first and second information, a ranking of the metrics based on their criticality to the upgrade event; receiving third information from the particular remote information handling system indicative of scores for the particular remote information handling system in the plurality of metrics; and determining a likelihood of success for the upgrade event based on the determined ranking of the metrics and the scores for the particular remote information handling system in the plurality of metrics.

In accordance with these and other embodiments of the present disclosure, an article of manufacture may include a non-transitory, computer-readable medium having computer-executable code thereon that is executable by a processor of an information handling system for: receiving a request from a particular remote information handling system regarding an upgrade event; receiving first information from a plurality of other remote information handling systems indicative of a success or a failure of a corresponding upgrade event that was performed at such other remote information handling systems; receiving second information from the plurality of other remote information handling systems indicative of scores for such other remote information handling systems in a plurality of metrics; determining, based on the first and second information, a ranking of the metrics based on their criticality to the upgrade event; receiving third information from the particular remote information handling system indicative of scores for the particular remote information handling system in the plurality of metrics; and determining a likelihood of success for the upgrade event based on the determined ranking of the metrics and the scores for the particular remote information handling system in the plurality of metrics.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
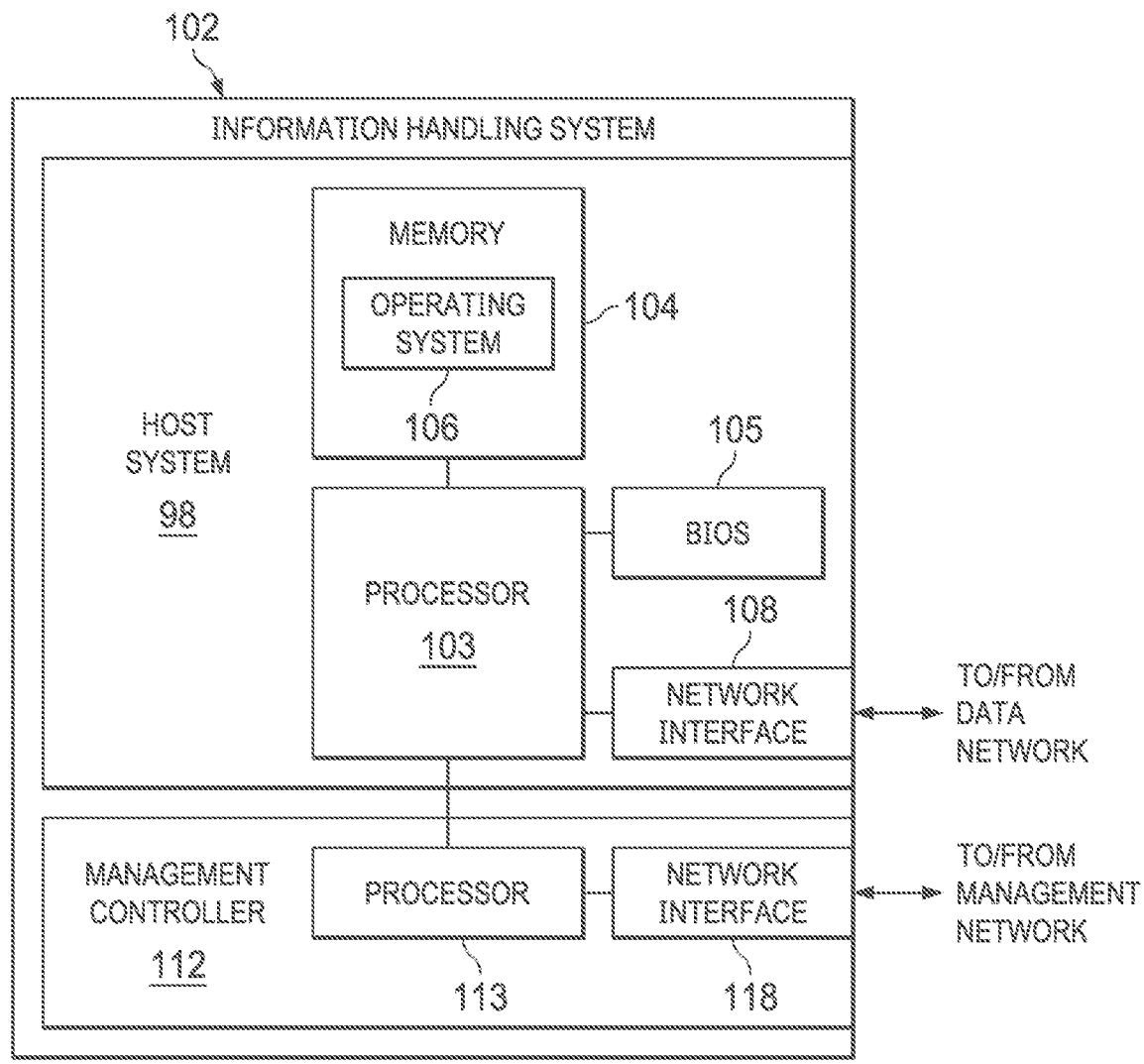
FIG. 1 illustrates a block diagram of an example information handling system, in accordance with embodiments of the present disclosure.
Figure 2:
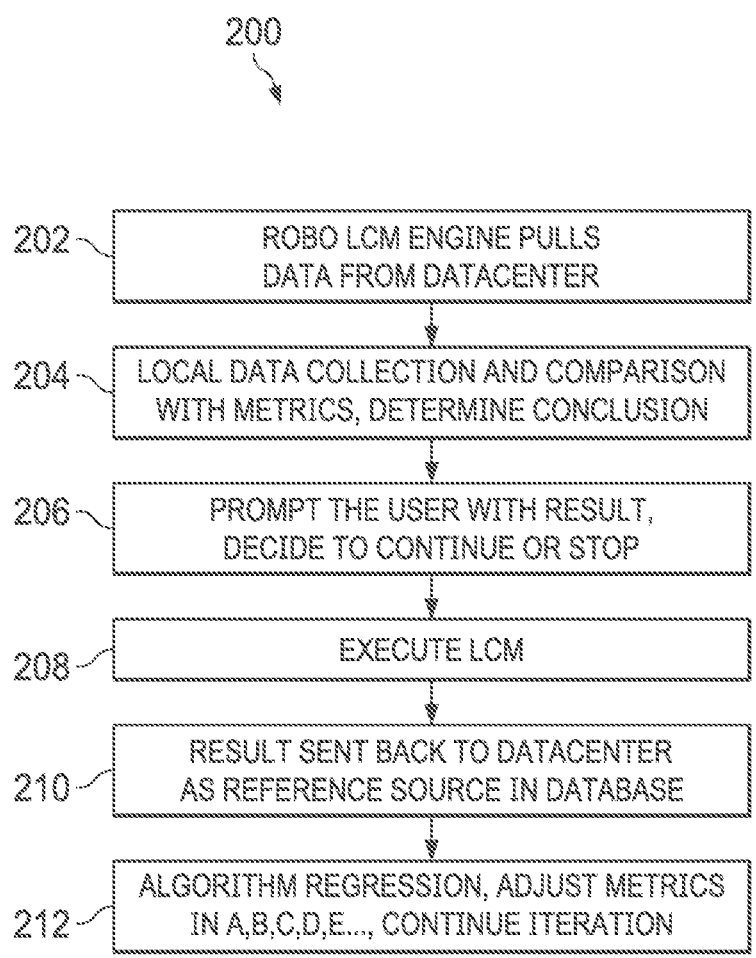
FIG. 2 illustrates an example method, in accordance with embodiments of the present disclosure.

Preferred embodiments and their advantages are best understood by reference to FIGS. 1 and 2, wherein like numbers are used to indicate like and corresponding parts. For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, it would be desirable to be able to predict the likelihood of success or failure for an LCM event, particularly in a ROBO-type deployment. In a ROBO-type deployment environment, LCM operation status data may be collected and controlled by a centralized datacenter, and the various ROBO sites may begin the LCM procedure according to their own scheduled maintenance windows.

To upgrade the entire ROBO grid to a certain level, typically some sites will start before others, and some sites will finish before others. The centralized datacenter may collect LCM status data on the basis of this deployment timeline, gathering useful data from earlier sites before the later sites begin the process. This data may be used to identify potential problems before they occur, etc. At a high level, a method may be carried out in some embodiments to execute an LCM event as follows.

1) A ROBO LCM service may execute a call to the centralized datacenter to look up reference information regarding the LCM upgrade (e.g., data regarding what has happened at other ROBO sites during the attempted LCM upgrade). If no reference data is available (which will likely be the case for the first few ROBO sites), then the LCM procedure may go ahead, as the success rate is not yet known.

2) As the first few clusters at ROBO sites finish the LCM event with either failure or success, they may report the results to the centralized datacenter. The centralized datacenter then contains several samples of LCM results.

3) For the later ROBO sites that are preparing to apply the LCM, they may follow step 1) and reach out to the centralized datacenter for reference data of success and failure cases. By comparing vital metrics between historical reports and the site that is about to apply the LCM, an analysis report on the failure or success likelihood can be generated. If the likelihood of failure is too high, some remedial action may be taken (e.g., delaying the LCM event or undertaking some hardware/software/firmware configuration change prior to attempting the LCM event).

4) The success rate for a site may be set to 100% initially. If a metric begins to emerge as being correlated with LCM failure, then a deduction based on that metric may be conducted, as applicable to that site. For example, if the metrics of a ROBO site exactly match a record of a successful LCM event in the centralized datacenter, then the analysis logic may generate an assertion of a high potential of success (e.g., 100%). On the other hand, if some of the metrics match metrics from failed LCM events, the initial 100% number may decline. Eventually it may decline to a critical low level, indicating a high possibility of failure instead.

5) The centralized datacenter may also maintain a mapping of the various metrics vs. the predicted success rate vs. the actual success rate.

Table 1 below provides an example of certain types of metrics that may be considered in some embodiments, as well as example deductions that may be applied to a success rate based on those metrics. For a single LCM operation which has not started yet, a 100% success rate may initially be assigned as a baseline, and deductions may be calculated based on the various metrics.

Although Table 1 provides one example for a set of possible numerical deductions, one of ordinary skill in the art with the benefit of this disclosure will understand that the actual values can be tailored to a given situation based on real-world factors. Further, there may be unknown issues falling outside of the predefined metrics that can cause LCM failures. In that case, the centralized datacenter may tag such issues and update them going forward in order to provide more accurate guidance.

TABLE 1

| Metric | Relativity | Total Deduction |
|---|---|---|
| A. Software stack baseline; is a known good state (KGS) implemented? | This includes the vital software stack of HCI. If a large deviation or drift is found, then there is a high possibility that the LCM attempt will end in failure. Total deduction = (−50%)*(Software stack drift + firmware and driver drift) Software stack drift = Enum{1,0} * 0.6 Firmware and driver drift = Enum(1,0} * 0.4 (These numbers assume that software stack drift is more critical than firmware and driver drift.) | −50% |
| B. Hardware configuration and health state | The hardware platform is vital to the success rate, especially the health state. If there is a report of failure or an issue on the hardware side, then there is high possibility that the LCM attempt will end in failure. For example, PSU failure, memory or CPU critical events, thermal issues, fan failure, etc. Total deduction = (−40%)*(PSU failure + CPU critical event + Thermal issue + fan failure) PSU failure = Enum{1,0}*0.2 CPU critical event = Enum{1,0}*0.4 Thermal issue = Enum{1,0}*0.2 Fan failure = Enum{1,0}*0.1 Many other platform-level components may also be taken into consideration in this metric | −40% |
| C. License type and configuration | The software that runs on an HCI cluster may provide different feature sets with different license types (e.g., basic vs. standard vs. deluxe). The absence of some critical feature may impact the LCM success rate. During the LCM procedure, the software may check some of the configurations to ensure pass rate. In a ROBO deployment, all clusters may involve similar use cases and business scenarios, and so the expectation is for limited deviations in this category. But this metric can also apply to a tiered deployment practice. Total deduction = (−30%)*License category License category = Enum(1, 0.8, 0.6, 0} 1.0, 0.8, 0.6, 0 are pre-defined values representative of various license categories. | −30% |
| D. Network bandwidth condition | LCM causes large network usage between remote sites and the centralized datacenter to sync up status and progress monitoring. Although timeout and retry mechanisms may be used to mitigate poor network conditions, it is still the case that better conditions may correlate to a higher success rate. Total deduction = (−10%) * Bandwidth Bandwidth = Enum{1, 0.8 , 0.5, 0.2, 0.1, 0}, bandwidth map = {1.5 mbps, 2 mbps, 10 mbps, 100 mbps, 200 mbps, 1000 mbps} | −10% |
| E. Realtime workload | Workload status also impacts LCM success, as there may be a requirement of maximum workload on a cluster for LCM to be able to proceed. For example, utilization may be limited to 80% or less; otherwise, the workload must be shifted to another idle cluster, or new resources must be added into the cluster to continue LCM. Total deduction = (−5%)*(VM level*0.3 + IOPS*0.7) VM level = {2000, 1500, 1000, 500, less than 500} may map to {1, 0.8, 0.5, 0.3, 0} VM level may be defined relative to the design capacity of a target cluster, configuration, generation, as well as VM type, which is a variable. IOPS may follow a similar model | −5% |

Accordingly, an LCM engine at the ROBO site may calculate and measure these metrics and provide to the end user an estimate of how likely this single LCM attempt is to succeed or fail. The user may then choose whether or not to proceed, or whether some preventative action should be undertaken before proceeding.

If a ROBO site completes the LCM event (in either success or failure), all of the metrics of that single instance may be uploaded to the centralized datacenter as a record to be stored in the database. Table 2 below provides example records of such a database. For purposes of Table 2, the metrics A, B, C, D, E, F, and G are listed in descending order of relevance. Reference Success Rate shows the predicted success rate of the next LCM attempt/operation. Actual shows the result of next LCM attempt that actually happened (Pass or Fail). Highest Failure Factor refers to which metric impacts the result the most. And the final column indicates failure=1 or success=0 in the database.

TABLE 2

| | A | B | C | D | E | F | G | Ref. Success Rate | Highest Failure Factor | Actual | Failure = 1, success = 0 |
|---|---|---|---|---|---|---|---|---|---|---|---|
| Seed cluster | | | | | | | | N/A | | Pass | 0 |
| ROBO cluster a | | | | X | X | | | 65% | D | Pass | 0 |
| ROBO cluster b | X | | | | | | | 50% | A | Fail | 1 |
| ROBO cluster c | X | X | | | | | | 45% | A | Fail | 1 |
| ROBO cluster d | | | | | | | X | 90% | G | Pass | 0 |
| ROBO cluster e | | | | | | X | | 90% | F | Pass | 0 |
| ROBO cluster f | | | | | | X | X | 85% | F | Fail | 1 |
| ... | | | | | | | | | | | |

As can be seen, the reference success rate for each cluster includes an example deduction based on which metrics include problems.

Quantitatively, assume that the LCM result is y, and that x is one of the Enumeration results (A, B, C, D, E, . . . ), such that for each metric and LCM result, we have correlation coefficient formula as such:

$$y_i = \beta x_i + \varepsilon$$

where i is the index of metric elements in the Enumeration, and $\beta$ and $\varepsilon$ are some constant values. Relativity may be defined as R, and y as the result of $x_i$ in {A, B, C, . . . } as metric enumeration:

$$R^2 = 1 - \frac{\sum_{i=1}^{n}(y_i - \hat{y}_i)^2}{\sum_{i=1}^{n}(y_i - \overline{y}_i)^2}$$

where $$\overline{y} = \frac{1}{n}\sum_{i=i}^{n} y_i$$

and n is the total number of pre-defined metrics.

Through this formula, the set of metrics that affect the final result most may be identified. Further, in a runtime environment the formula may be used to improve the accuracy of predictions on a single LCM attempt at a ROBO site. In this way, the centralized datacenter may provide dynamic information such that the branch sites may learn from past experiences to guide the next action.

Although the formulas discussed above may provide one way of adjusting the relativity scores for each metric, other techniques may be used in other embodiments. As one of ordinary skill in the art with the benefit of this disclosure will appreciate, many existing statistical tools may also be employed in such an approach.

The centralized datacenter may also push relevant Knowledge Base articles or other reference materials to the ROBO site along with the prediction result, so that the ROBO operator can reference such materials and correct any issues that are leading to a prediction of failure. The operator may then try the prediction operation again (e.g., without applying the actual LCM upgrade) to see if the prediction has improved. This may cause less impact to the business workload than attempting the LCM upgrade itself and experiencing a failure.

The information in the database may provide a clear view of the relativity between the metrics and the actual result. After hundreds or thousands of attempts, the centralized datacenter may be able to determine with high accuracy which metrics affect the LCM success rate most, and the next time when a ROBO site reaches out to the datacenter for LCM reference information, the center can offer even more accurate guidance.

Turning now to FIG. 2, a flow chart is shown of an example method 200 for predictively determining the success rate of LCM events. At step 202, the LCM engine (e.g., a software update agent) at a ROBO site may query the centralized datacenter to retrieve data regarding an upcoming LCM event. For example, such data may include an indication of which metrics have been found to be most critical as to the success of the particular LCM event.

At step 204, data may be collected regarding the local ROBO site environment. For example, data may be collected regarding the actual state of the ROBO site with respect to the various metrics discussed above, in order to determine whether or not such metrics might weigh against the successful completion of the LCM event. Such data may be collected, in some embodiments, via one or more management controllers of the ROBO site. Based on the local data collection and the data retrieved from the centralized datacenter, an overall estimate may be determined for the likelihood of success.

At step 206, the user (e.g., administrator) at the ROBO site may be presented with the results of step 204. The user may then decide whether or not to proceed. The user may also receive information about the most relevant metrics, so that if some remedial action is needed to improve the success rate, the most important remediations may be indicated. If the user decides not to proceed, the method may end. If the user decides to proceed, the method may proceed to step 208, in which the LCM event is executed.

After the LCM event has completed (whether in success or failure), data regarding the event may be send back to the centralized datacenter at step 210. For example, the data may indicate the success or failure, as well as the various conditions at the ROBO site corresponding to the metrics.

At step 212, the centralized datacenter may incorporate the results from step 210 into its database. For example, as more and more data is accumulated, it may become apparent that a particular metric is more (or less) critical to the LCM event than was previously estimated. Based on such a determination, the database may be adjusted to reflect that fact.

As one of ordinary skill in the art with the benefit of this disclosure will appreciate, many of the steps of method 200 may be performed at the ROBO site, at the centralized datacenter, or elsewhere in various embodiments.

One of ordinary skill in the art with the benefit of this disclosure will understand that the preferred initialization point for the method depicted in FIG. 2 and the order of the steps comprising that method may depend on the implementation chosen. In these and other embodiments, this method may be implemented as hardware, firmware, software, applications, functions, libraries, or other instructions. Further, although FIG. 2 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

Accordingly, embodiments of this disclosure may provide many advantages. For example, embodiments may offer guidance of how likely a single attempt of LCM at a ROBO branch is to succeed or fail. A customer may be provided a reference of the predicted success rate of this LCM attempt, as well as guidance as to what system changes should be made when the predicted success rate is low. This may improve customer satisfaction, reduce total cost of ownership, and reduce support costs.

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor; and
   a non-transitory memory coupled to the at least one processor;
   wherein the information handling system is configured to manage an upgrade event of a particular remote information handling system by:
   receiving first information from a plurality of other remote information handling systems indicative of a success or a failure of a corresponding upgrade event that was performed at such other remote information handling systems;
   receiving second information from the plurality of other remote information handling systems indicative of scores for such other remote information handling systems in a plurality of metrics;
   determining, based on the first and second information, a ranking of the metrics based on their criticality to the upgrade event;
   receiving third information from the particular remote information handling system indicative of scores for the particular remote information handling system in the plurality of metrics;
   determining a likelihood of success for the upgrade event based on the determined ranking of the metrics and the scores for the particular remote information handling system in the plurality of metrics; and
   in response to the determined likelihood being below a threshold likelihood, causing the remote information handling system to undertake a remedial action prior to carrying out the upgrade event.

2. The information handling system of claim 1, wherein the remote information handling systems each comprise hyper-converged infrastructure (HCI) clusters.

3. The information handling system of claim 1, wherein the information handling system is further configured to transmit the likelihood of success for the upgrade event to a user of the particular remote information handling system.

4. The information handling system of claim 1, wherein the information handling system is further configured to transmit at least one item of reference material to a user of the particular remote information handling system regarding improving the likelihood of success for the upgrade event.

5. The information handling system of claim 4, wherein the at least one item of reference material is transmitted in response to the likelihood of success for the upgrade event falling below a threshold likelihood.

6. The information handling system of claim 4, wherein the at least one item of reference material is transmitted in response to the user opting not to proceed with the upgrade event.

7. The information handling system of claim 1, wherein the information handling system is further configured to:
   receive information from the particular remote information handling system indicative of a success or a failure of the upgrade event; and
   update the ranking of the metrics based on the received information.

8. A computer-implemented method comprising:
- receiving a request from a particular remote information handling system regarding an upgrade event;
- receiving first information from a plurality of other remote information handling systems indicative of a success or a failure of a corresponding upgrade event that was performed at such other remote information handling systems;
- receiving second information from the plurality of other remote information handling systems indicative of scores for such other remote information handling systems in a plurality of metrics;
- determining, based on the first and second information, a ranking of the metrics based on their criticality to the upgrade event;
- receiving third information from the particular remote information handling system indicative of scores for the particular remote information handling system in the plurality of metrics;
- determining a likelihood of success for the upgrade event based on the determined ranking of the metrics and the scores for the particular remote information handling system in the plurality of metrics; and
- in response to the determined likelihood being below a threshold likelihood, causing the remote information handling system to undertake a remedial action prior to carrying out the upgrade event.

9. The method of claim 8, wherein the remote information handling systems each comprise hyper-converged infrastructure (HCI) clusters.

10. The method of claim 8, further comprising transmitting the likelihood of success for the upgrade event to a user of the particular remote information handling system.

11. The method of claim 8, further comprising transmitting at least one item of reference material to a user of the particular remote information handling system regarding improving the likelihood of success for the upgrade event.

12. The method of claim 8, further comprising:
- receiving information from the particular remote information handling system indicative of a success or a failure of the upgrade event; and
- updating the ranking of the metrics based on the received information.

13. The method of claim 8, wherein the plurality of metrics includes a software stack baseline metric, a hardware configuration and health state metric, a license type and configuration metric, a network bandwidth metric, and a workload metric.

14. An article of manufacture comprising a non-transitory, computer-readable medium having computer-executable code thereon that is executable by a processor of an information handling system for:
- receiving a request from a particular remote information handling system regarding an upgrade event;
- receiving first information from a plurality of other remote information handling systems indicative of a success or a failure of a corresponding upgrade event that was performed at such other remote information handling systems;
- receiving second information from the plurality of other remote information handling systems indicative of scores for such other remote information handling systems in a plurality of metrics;
- determining, based on the first and second information, a ranking of the metrics based on their criticality to the upgrade event;
- receiving third information from the particular remote information handling system indicative of scores for the particular remote information handling system in the plurality of metrics;
- determining a likelihood of success for the upgrade event based on the determined ranking of the metrics and the scores for the particular remote information handling system in the plurality of metrics; and
- in response to the determined likelihood being below a threshold likelihood, causing the remote information handling system to undertake a remedial action prior to carrying out the upgrade event.

15. The article of claim 14, wherein the remote information handling systems each comprise hyper-converged infrastructure (HCI) clusters.

16. The article of claim 14, wherein the code is further executable for:
- transmitting the likelihood of success for the upgrade event to a user of the particular remote information handling system.

17. The article of claim 14, wherein the code is further executable for:
- transmitting at least one item of reference material to a user of the particular remote information handling system regarding improving the likelihood of success for the upgrade event.

18. The article of claim 17, wherein the at least one item of reference material is transmitted in response to the likelihood of success for the upgrade event falling below a threshold likelihood.

19. The article of claim 17, wherein the at least one item of reference material is transmitted in response to the user opting not to proceed with the upgrade event.

20. The article of claim 14, wherein the code is further executable for:
- receiving information from the particular remote information handling system indicative of a success or a failure of the upgrade event; and
- updating the ranking of the metrics based on the received information.

* * * * *